US012535008B2

(12) United States Patent
Kryj-Kos

(10) Patent No.: US 12,535,008 B2
(45) Date of Patent: Jan. 27, 2026

(54) AIRFOIL ASSEMBLY HAVING A COMPOSITE CORE

(71) Applicant: GENERAL ELECTRIC COMPANY, Schenectady, NY (US)

(72) Inventor: Elzbieta Kryj-Kos, Liberty Township, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/480,192

(22) Filed: Oct. 3, 2023

(65) Prior Publication Data

US 2025/0109693 A1 Apr. 3, 2025

(51) Int. Cl.
*F01D 5/28* (2006.01)

(52) U.S. Cl.
CPC ...... *F01D 5/282* (2013.01); *F05D 2300/6034* (2013.01)

(58) Field of Classification Search
CPC .................. F01D 5/282; F05D 2300/6034
See application file for complete search history.

(56) References Cited

U.S. PATENT DOCUMENTS

| 3,883,267 | A | * | 5/1975 | Baudier | F01D 5/282 |
| | | | | | 416/241 A |
| 5,038,291 | A | | 8/1991 | Wang et al. | |
| 5,222,297 | A | * | 6/1993 | Graff | B29C 70/865 |
| | | | | | 29/889.7 |
| 5,279,892 | A | | 1/1994 | Baldwin et al. | |
| 5,308,228 | A | * | 5/1994 | Benoit | F01D 5/282 |
| | | | | | 156/93 |
| 6,450,450 | B1 | | 9/2002 | MacDonald et al. | |
| 7,547,194 | B2 | | 6/2009 | Schilling | |
| 7,600,978 | B2 | * | 10/2009 | Vance | F01D 5/147 |
| | | | | | 416/241 B |
| 8,105,042 | B2 | | 1/2012 | Parkin et al. | |
| 8,419,374 | B2 | | 4/2013 | Huth et al. | |
| 8,696,319 | B2 | | 4/2014 | Naik | |
| 9,416,668 | B2 | | 8/2016 | Muron | |
| 9,550,332 | B2 | | 1/2017 | Karem | |
| 10,099,434 | B2 | | 10/2018 | Anderson et al. | |
| 10,865,649 | B2 | | 12/2020 | Thomas | |
| 11,168,568 | B2 | | 11/2021 | Theertham | |
| 2011/0054850 | A1 | | 3/2011 | Roach | |
| 2011/0129348 | A1 | | 6/2011 | Parkin et al. | |
| 2013/0330496 | A1 | | 12/2013 | Kray | |
| 2016/0101591 | A1 | * | 4/2016 | Khan | F01D 5/282 |
| | | | | | 428/113 |
| 2016/0201478 | A1 | | 7/2016 | Kray | |

(Continued)

FOREIGN PATENT DOCUMENTS

EP    3428399 B1    1/2019
WO    2022184997 A1    9/2022

*Primary Examiner* — Michael L Sehn
(74) *Attorney, Agent, or Firm* — McGarry Bair PC

(57) ABSTRACT

An airfoil assembly and engine component for a turbine engine having an engine core extending along an engine centerline, the airfoil assembly having an airfoil extending between a root and a tip in a radial direction, away from the engine centerline, to define a span length. The airfoil comprising a composite core and a set of skins defining at least a portion of an exterior surface of the airfoil. A shank extending in the radial direction from the root toward the engine centerline and having a flared cross-section.

20 Claims, 6 Drawing Sheets

(56) References Cited

U.S. PATENT DOCUMENTS

| | | |
|---|---|---|
| 2019/0301285 A1 | 10/2019 | Kamiya |
| 2019/0331127 A1* | 10/2019 | Foster ................... F04D 29/388 |
| 2023/0010778 A1 | 1/2023 | Coutier |
| 2023/0272718 A1* | 8/2023 | Armstrong .............. F01D 5/282 |
| | | 416/230 |
| 2024/0141917 A1 | 5/2024 | Joudon |

* cited by examiner

AIRFOIL ASSEMBLY HAVING A COMPOSITE CORE

TECHNICAL FIELD

The disclosure generally relates to an airfoil assembly, and more specifically to an airfoil assembly with a composite core.

BACKGROUND

Turbine engines, and particularly gas or combustion turbine engines, are rotary engines that extract energy from a flow of gases passing through a fan with a plurality of fan blades, then into the engine through a series of compressor stages, which include pairs of rotating blades and stationary vanes, through a combustor, and then through a series of turbine stages, which include pairs of rotating blade and stationary vanes. The blades are mounted to rotating disks, while the vanes are mounted to stator disks.

During operation air is brought into the compressor section through the fan section where it is then pressurized in the compressor and mixed with fuel in the combustor for generating hot combustion gases which flow downstream through the turbine stages where the air is expanded and exhausted out an exhaust section. The expansion of the air in the turbine section is used to drive the rotation sections of the fan section and the compressor section. The drawing in of air, the pressurization of the air, and the expansion of the air is done, in part, through rotation of various rotating blades mounted to respective disks throughout the fan section, the compressor section and the turbine section, respectively.

Composite materials typically include a fiber-reinforced matrix and exhibit a high strength to weight ratio. Due to the high strength to weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine. Extreme loading, sudden forces, or heat can be applied to the composite components of the aircraft or turbine engine. For example, extreme loading can occur to one or more airfoils during ingestion of various materials by the turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
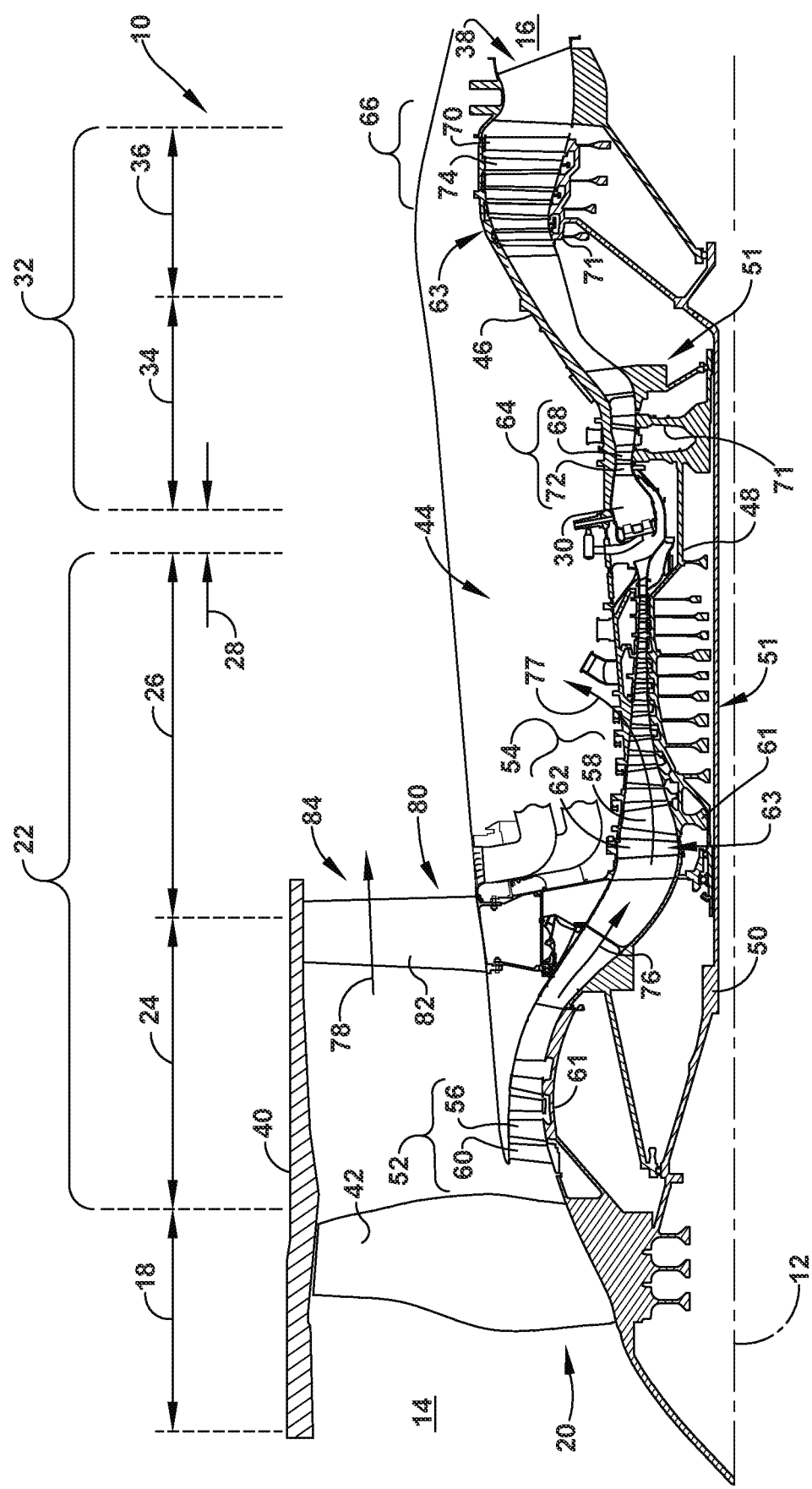
FIG. 1 is a schematic cross-sectional view of a turbine engine in accordance with an exemplary embodiment of the present disclosure.

Aspects of the disclosure herein are directed to a turbine engine including an airfoil assembly with a composite core and a set of skins defining at least a portion of a dovetail and an airfoil. The airfoil assembly can be used at one or more locations within the turbine engine. For example, the airfoil assembly is suitable as a fan blade in a fan section of a turbine engine, although other locations, such as the compressor section and turbine section are contemplated. The airfoil assembly can be mounted in a variety of ways. One such mounting is securing the blades to a spinner of the fan section, directly, or via a pitch control assembly. Wherever the airfoil assembly is located, one suitable mounting is a disk assembly that has complementary sockets to receive the dovetail, with the sockets circumferentially spaced about the periphery of the disk assembly. The airfoil assembly and disk assembly can collectively form a rotating assembly such that the airfoil assembly is a composite blade assembly.

The airfoil assembly further includes a foam core within the composite core and a set of Z-fibers extending at least partially through one of the composite core, the set of skins, and the foam core. The airfoil assembly is designed to withstand high mechanical stresses associated with the operation of the turbine engine while providing lightweight construction. For purposes of illustration, the present disclosure will be described with respect to an airfoil assembly for a turbine engine, specifically an airfoil assembly provided within a fan section of the turbine engine. It will be understood, however, that aspects of the disclosure described herein are not so limited and can have general applicability within other engines or within other portions of the turbine engine. For example, the disclosure can have applicability for an airfoil assembly in other engines or vehicles, and can be used to provide benefits in industrial, commercial, and residential applications. Further, aspects of this disclosure will be directed towards a composite blade assembly including a dovetail. It will be appreciated that aspects of this disclosure are directed towards any airfoil assembly. While illustrated as having a dovetail, the airfoil assembly could comprise a T-flange root. Further the airfoil assembly is not limited and could be a composite blade assembly or a composite vane assembly.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Further yet, as used herein, the term "fluid" or iterations thereof can refer to any suitable fluid within the gas turbine engine wherein at least a portion of the gas turbine engine is exposed to such as, but not limited to, combustion gases, ambient air, pressurized airflow, working airflow, or any combination thereof. It is yet further contemplated that the gas turbine engine can be other suitable turbine engines such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The term "composite," as used herein is, is indicative of a component having two or more materials. A composite can be a combination of at least two or more metal, non-metallic, or a combination of metal and non-metallic elements or materials. Examples of a composite material can be, but not limited to, a polymer matrix composite (PMC), a ceramic matrix composite (CMC), a metal matrix composite (MMC), carbon fibers, polymeric resins, thermoplastics, bismaleimide (BMI) materials, polyimide materials, epoxy resins, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al2O_3 \cdot 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing, to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

"Foam Core" as used herein is a rigid structural foam having high shear and pressure resistance even at an elevated temperature.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

"Modulus" as used herein is in reference to an object's or a material's resistance to being deformed when a stress is applied to it.

"Skin" as used herein refers to a layer of material having multiple plies or layers of composite materials.

FIG. 1 is a schematic cross-sectional diagram of a turbine engine 10 for an aircraft. The turbine engine 10 has a generally longitudinally extending axis or engine centerline 12 extending forward 14 to aft 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10, which generates combustion gases. The engine core 44 is surrounded by a core casing 46, which can be coupled with the fan casing 40.

An HP shaft or spool 48 disposed coaxially about the engine centerline 12 of the turbine engine 10 drivingly connects the HP turbine 34 to the HP compressor 26. An LP shaft or spool 50, which is disposed coaxially about the engine centerline 12 of the turbine engine 10 within the larger diameter annular HP spool 48, drivingly connects the LP turbine 36 to the LP compressor 24 and fan 20. The spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to (or integral to) a disk 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50. The static turbine vanes 72, 74 for a stage of the compressor can be mounted to the core casing 46 in a circumferential arrangement.

Complementary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and an exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased above the bleed air temperature. The bleed air 77 may be used to reduce the temperature of the core components downstream of the combustor 30.

A remaining portion of the pressurized airflow 76 bypasses the LP compressor 24 and engine core 44 as a bypass airflow 78 and exits the turbine engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
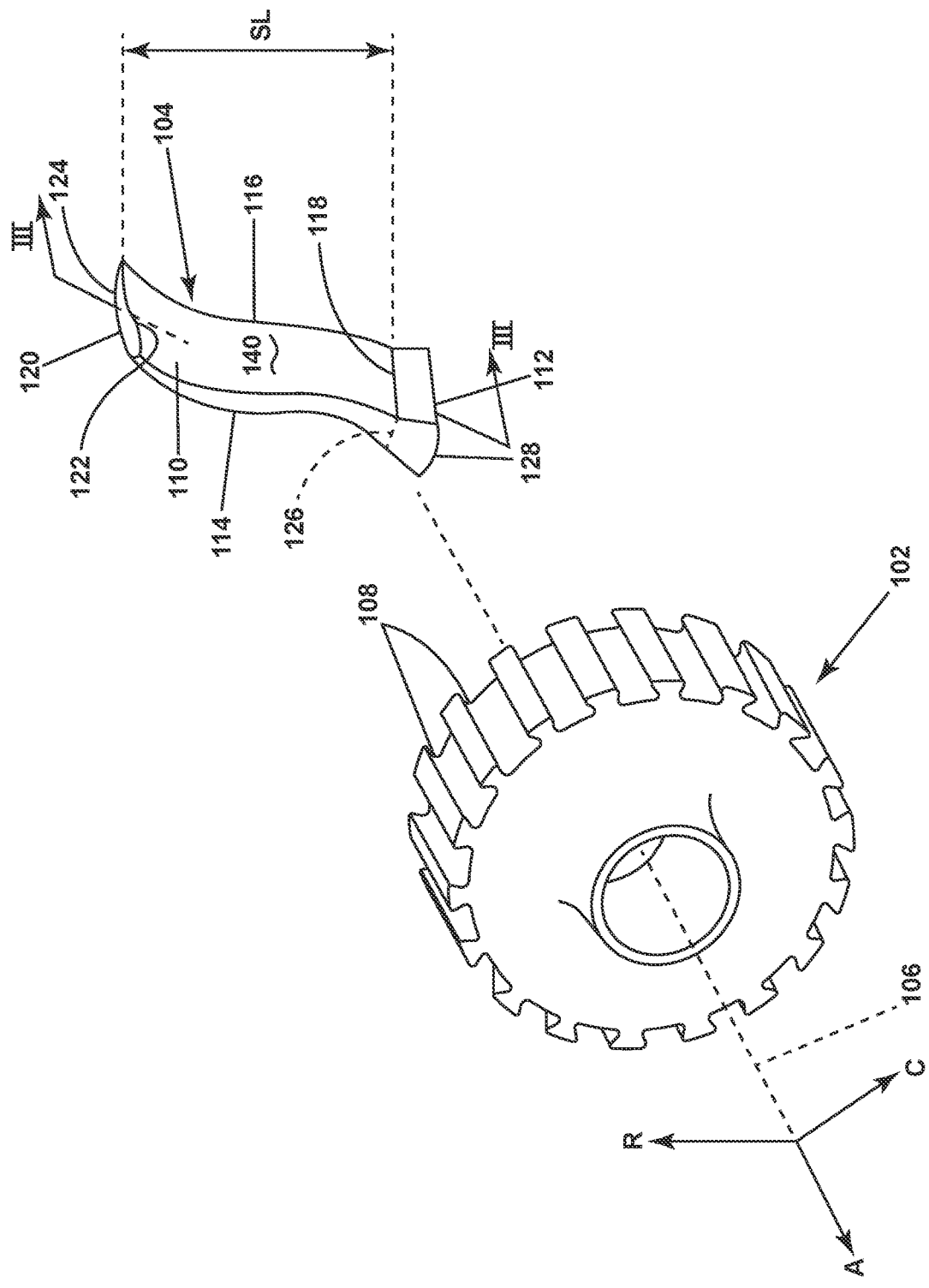
FIG. 2 is a schematic perspective view of an airfoil assembly and disk assembly suitable for use within the turbine engine of FIG. 1, the airfoil assembly including an airfoil and a dovetail.

FIG. 2 is a schematic perspective view of an airfoil assembly 104 and a disk assembly 102 suitable for use within the turbine engine 10 of FIG. 1. The disk assembly 102 is suitable for use as the disk 61, 71 (FIG. 1) or any other disk such as, but not limited to, a disk within the fan section 18 (FIG. 1), the compressor section 22 (FIG. 1), or the turbine section 32 (FIG. 1) of the turbine engine 10. The airfoil assembly 104 can be rotating or non-rotating such that the airfoil assembly 104 can include at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the plurality of fan blades 42 (FIG. 1). As a non-limiting example, the airfoil assembly 104 can be a composite fan blade assembly.

The disk assembly 102 can be rotatable or stationary about a rotational axis 106. The rotational axis 106 can coincide with or be offset from the engine centerline (e.g., the engine centerline 12 of FIG. 1). The disk assembly 102 includes a plurality of slots 108 extending axially through a radially outer portion of the disk assembly 102 and being circumferentially spaced about the disk assembly 102, with respect to the rotational axis 106. The rotational axis 106 can define an axial direction (denoted "A"). A radial direction (denoted "R") extends radially outward and perpendicular to the axial direction A. Further a circumferential direction (denoted "C") with respect to the rotational axis 106, extending perpendicular to both the axial direction A and radial direction R, is illustrated.

The airfoil assembly 104 can be any engine component having a shank, or a part by which the engine component can be attached to another engine component. By way of non-limiting example the engine component is an airfoil 110 and the shank is a dovetail 112 extending from the airfoil 110. The shank can be any appropriate attachment geometry, including a T-flange root. The airfoil 110 extends between a leading edge 114 and a trailing edge 116 to define a chord-wise direction. The airfoil 110 extends between a root 118 and a tip 120 to define a span length (denoted "SL") extending in the radial direction R. The root defines 0% of the span length SL and the tip defines 100% of the span length SL. The airfoil 110 includes an airfoil exterior surface 144 defining a pressure side 122 and a suction side 124 of the airfoil 110. The dovetail 112 extends between a first end 126 and a second end 128 in the radial direction R. The first end 126 denotes a transition between the dovetail 112 and the airfoil 110. As a non-limiting example, the first end 126 coincides with the root 118 of the airfoil 110. The dovetail 112 and the airfoil 110 can be integrally or non-integrally formed with each other.

The airfoil assembly 104 is coupled to the disk assembly 102 by inserting at least a portion of the dovetail 112 into a respective slot of the plurality of slots 108 such that the second end 128 faces the disk assembly 102. The airfoil assembly 104 is held in place by frictional contact with the slot 108 or can be coupled to the slot 108 via any suitable coupling method such as, but not limited to, welding, adhesion, fastening, or the like. While only a single airfoil assembly 104 is illustrated, it will be appreciated that there can be any number of one or more composite airfoils assemblies 104 coupled to the disk assembly 102. As a non-limiting example, there can be a plurality of composite airfoil assemblies 104 corresponding to a total number of slots of the plurality of slots 108. The airfoil assembly 104 as discussed herein allows an efficient load transfer from the airfoil 110 through the dovetail 112 to the disk assembly 102.

Figure 3:
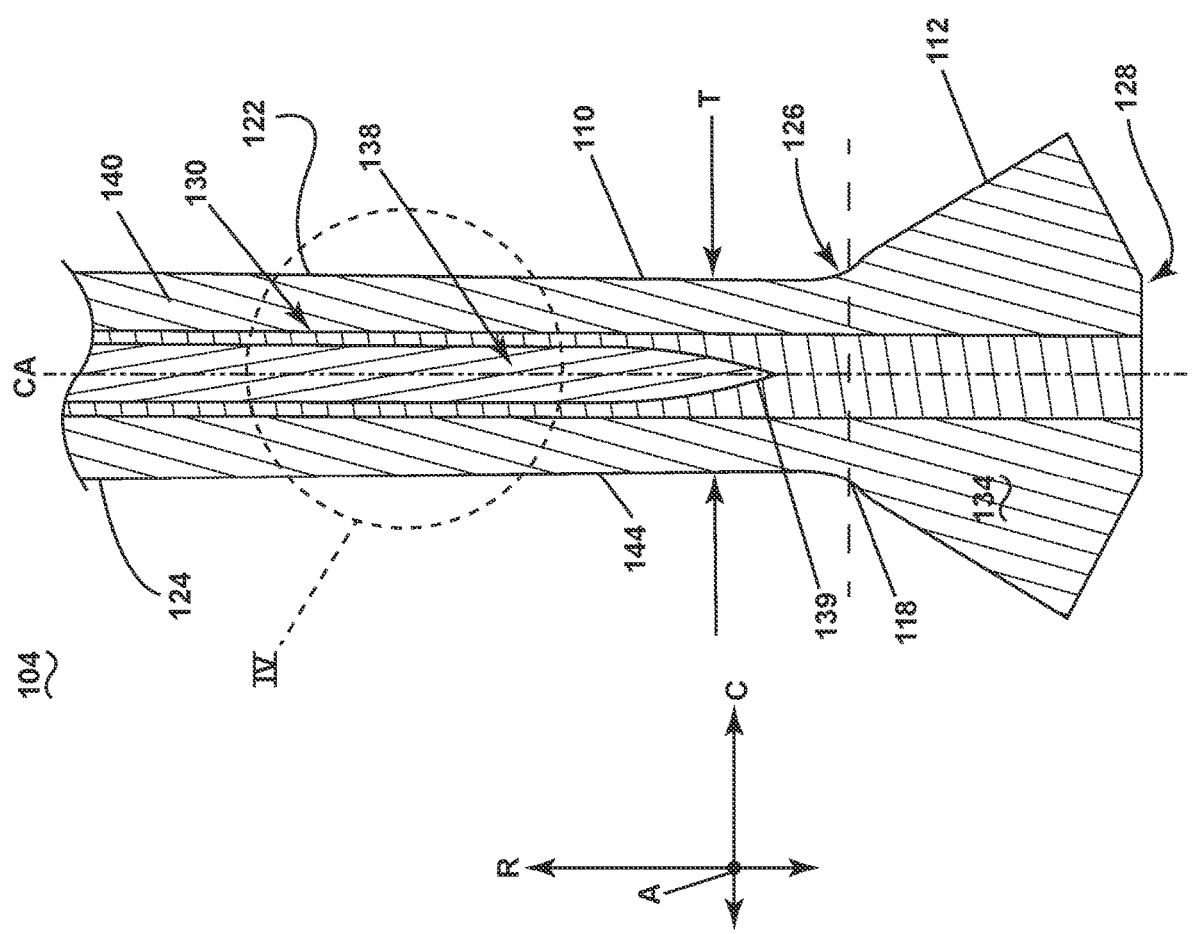
FIG. 3 is a schematic cross-sectional front view of a section of the airfoil assembly as seen from sectional line III-III of FIG. 2, further illustrating a composite core, a foam core, and a set of skins.

FIG. 3 is a schematic cross-sectional front view of a portion of the airfoil assembly 104 as seen from sectional line III-III of FIG. 2. The airfoil assembly 104 extends along a centerline axis CA extending from the first end 126 of the dovetail 112 to the tip 120 (FIG. 2) of the airfoil 110. The centerline axis CA is equidistant from respective opposing portions of the airfoil assembly 104. The centerline axis CA can be linear or non-linear. The airfoil assembly 104 can be symmetric or non-symmetric about the centerline axis CA. The centerline axis CA can also be a body axis, which, in the case of an asymmetrical airfoil, may not extend along the center of the body. The dovetail 112 can have a flared cross-section 134 with respect to the centerline axis CA.

The airfoil assembly 104 includes a composite core 130 defining and extending between portions of the dovetail 112 and the airfoil 110. The composite core 130 can extend from the second end 128 to the tip 120 (FIG. 2) along the centerline axis CA. A foam core 138 is located within the composite core 130. The composite core 130 can define various portions of the airfoil 110 and the dovetail 112, while the foam core 138 defines a core of the airfoil 110.

The foam core 138 can extend along the centerline axis CA and define at least a portion of the airfoil 110. The foam core 138 can include a tapered end point 139 spaced radially outward from the root 118 and within the composite core 130. The tapered end point 139 is located between 0% and 5% of the span length SL of the airfoil. In one non-limiting example, the foam core 138 can extend from the root 118 to the tip 120 (FIG. 2), in other words an entire length of the airfoil 110. In another non-limiting example, the foam core 138 extends from 20% to 80% of the span length SL.

A set of skins 140 overlies the composite core 130. As a non-limiting example, skins as referred to herein can be defined as a laminate skin, woven or a braided skin, or any combination thereof. The set of skins 140 can be any suitable type of skin. The set of skins 140 can be layers of skins layered directly in contact with adjacent skins in the airfoil 110. The set of skins 140 can define various portions of the airfoil 110 and the dovetail 112. The set of skins 140 can define at least a portion of the airfoil exterior surface 144. The airfoil 110 extends a thickness (denoted "T") between the pressure side 122 and the suction side 124.

Figure 4:
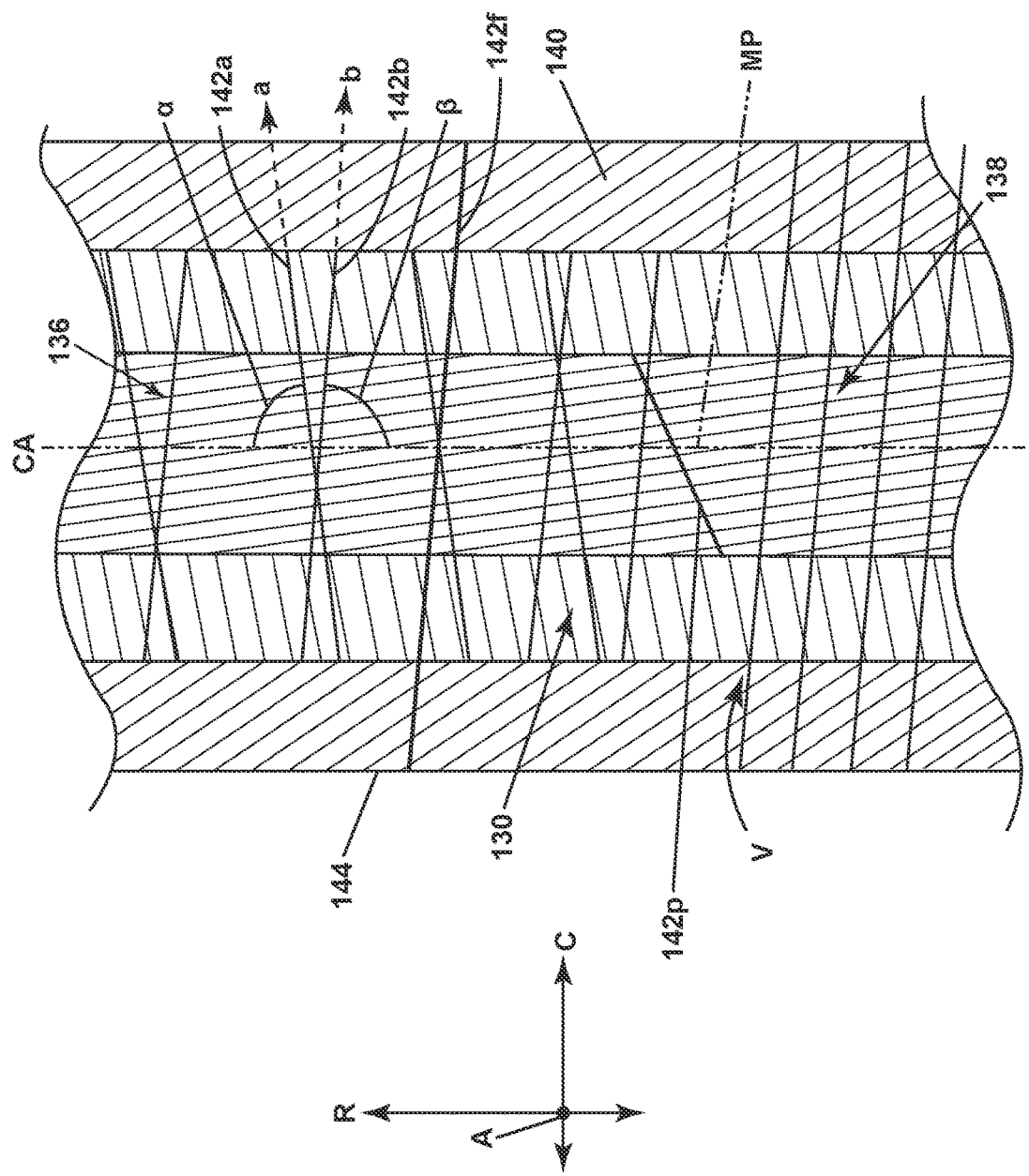
FIG. 4 is an enlarged schematic cross-section of the composite core and foam core with a set of Z-fibers according to an aspect of the disclosure herein.

FIG. 4 is an enlarged view of the composite core 130 and foam core 138 from a section IV in FIG. 3. A mid-plane MP is a plane oriented central to the airfoil 110 and extending along the centerline axis CA. While illustrated as extending along the radial direction R, the mid-plane MP can be curved. A set of Z-fibers 136 pierce the foam core 138 and extend through the foam core 138 into the composite core 130. The set of Z-fibers 136 can include at least one first direction fiber 142a that extends linearly along a first direction (denoted "a") through the mid-plane MP at a first fiber angle α. The first fiber angle α is measured between the mid-plane MP and the at least one first direction fiber 142a. The first fiber angle α ranges from 30° to 90°, with respect to the mid-plane MP. The set of Z-fibers can further include at least one second direction fiber 142b that extends linearly along a second direction (denoted "b") through the mid-plane MP at a second fiber angle β. The second fiber angle β is from −30° to 90°, with respect to the mid-plane MP.

The set of Z-fibers 136 includes fibers that extend through the mid-plane MP and span from 5% to 100% of the thickness T of the airfoil 110. For example, the set of Z-fibers 136 can include at least one full span fiber 142f (or set of fibers 142f, also referred to below as a full extension set of fibers) that extends through the mid-plane MP and across an entire, or 100% of the thickness T. By way of further example, the set of Z-fibers 136 can include at least one partial span fiber 142p that extends through the mid-plane MP while only spanning less than 100%, such as 5%, 20%, 30%, 50%, or 70% of the thickness T. It is further contemplated that the set of Z-fibers 136 includes any number of partial span fibers 142p that extend through the mid-plane MP and span from 5% to less than 100% of the thickness T. A partial span fiber 142p (or set of fibers 142p) can extend through the mid-plane MP and span all or only a portion of the thickness of the foam core 138 to reinforce the foam core 138. A partial span fiber 142p (or set of fibers 142p, also referred to below as a mid-expansion set of fibers) can extend through the mid-plane MP and span all or only a portion of the thickness of the composite core 130, both reinforcing the foam core and connecting the foam core to the composite core. Also, a partial span fiber 142p (or set of fibers 142p) can extend through the mid-plane MP and span a portion of the thickness of the set of skins 140 to reinforce the foam core 138 and tie together the foam core 138, the composite core 130 and the set of skins 140.

It should be understood that any of the first direction fibers 142a can also be either a full span fiber 142f or a partial span fiber 142p. Further any of the second direction fibers 142b can also be either a full span fiber 142f or a partial span fiber 142p.

Figure 5:
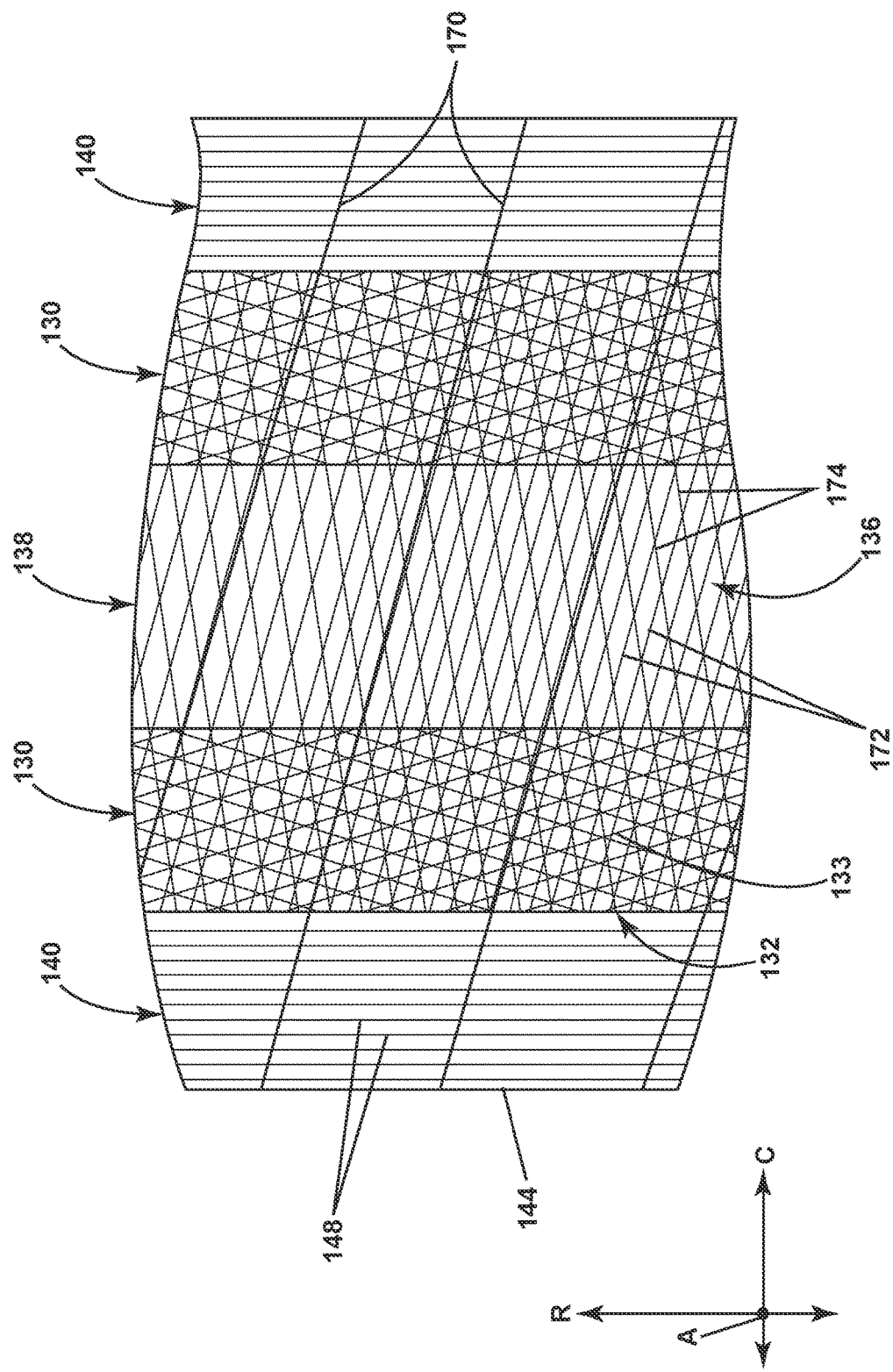
FIG. 5 is an enlarged schematic cross-section of the composite core, foam core, and a set of skins with a set of Z-fibers according to another aspect of the disclosure herein.

FIG. 5 is a magnified schematic view of the composite core 130, the foam core 138, and the set of skins 140 from section V at the bottom of FIG. 4. It can more easily be seen that the set of skins 140 are multiple layers 148. The multiple layers 148 can include at least one laminated skin or at least one braided skin. The multiple layers 148 can further include at least one set of filler plies or a set of machining plies. The multiple layers 148 can further include prepreg laminates.

The composite core 130 can include a composite layer 132 surrounding the foam core 138. The composite layer 132 can be a 3D composite layer in the form of a fiber preform or a braided core or a woven composite preform. The composite layer 132 can be a dry preform or a precured preform. The composite layer 132 can include at least one material 133 oriented in three different directions commonly referred to as a warp, a weft, and a binder orientation when a woven process is utilized to form the composite core 130. While described as a woven process, it should be understood that any process resulting in the orientations described herein is contemplated. The composite layer 132 can be combined with the set of skins 140 by Resin Transfer Molding (RTM) or Same Qualified Resin Transfer Molding (SQ-RTM) to form a single composite component.

The set of Z-fibers 136 includes a full extension set of fibers 170, a first mid-extension set of fibers 172, and a second mid-extension set of fibers 174. The full extension set of fibers 170 (e.g., full span fibers 142f) extend across an entirety of the foam core 138, the composite core 130, and the set of skins 140. The first mid-extension set of fibers 172 (e.g., partial span fibers 142p) extend across an entirety of the foam core 138 and the composite core 130. The second mid-extension set of fibers 174 (e.g., partial span fibers 142p) extend across an entirety of the foam core 138 and the composite core 130.

Figure 6:
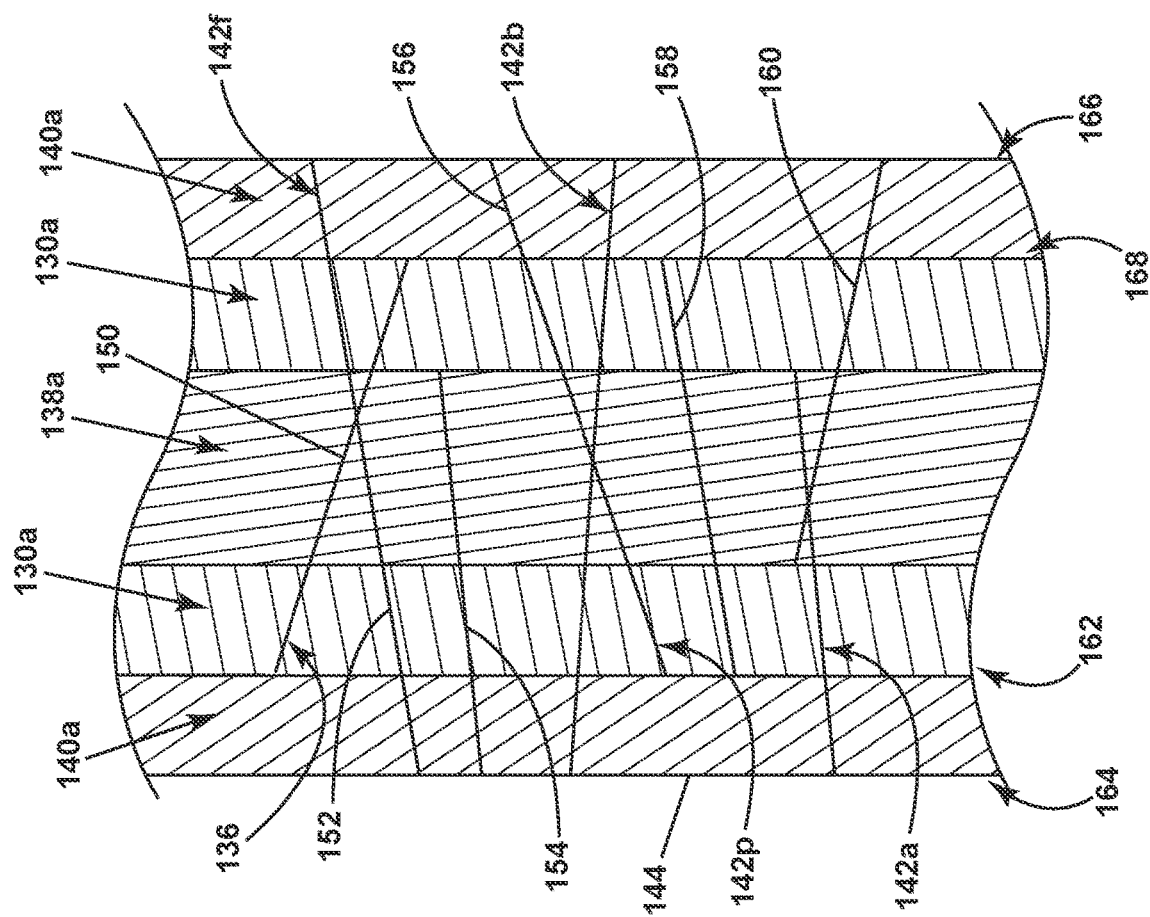
FIG. 6 is a magnified schematic view of the composite core, foam core, and a set of skins with a set of Z-fibers according to yet another aspect of the disclosure herein.
Figure 6:
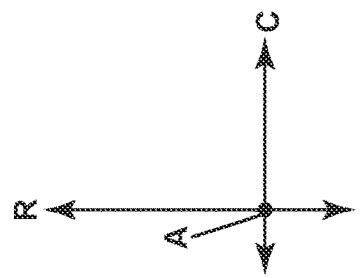

FIG. 6 is an enlarged view of a composite core 130a, a foam core 138a, and a set of skins 140a according to another aspect of the disclosure herein. In another exemplary arrangement, the set of Z-fibers 136 can extend through any combination of the foam core 138a, the composite core 130a, and the set of skins 140a. A first fiber 150 can be a second direction fiber 142b and a partial span fiber 142p that extends through the foam core 138a and the composite core 130a. A second fiber 152 can be a first direction fiber 142a and a full span fiber 142f that extends through the foam core 138a, the composite core 130a, and the set of skins 140a. A third fiber 154 can be a first direction fiber 142a and a partial span fiber 142p that extends through the foam core 138a, a first side 162 of the composite core 130*a*, and a first side 164 of the set of skins 140*a*. A fourth fiber 156 can be a first direction fiber 142*a* and a partial span fiber 142*p* that extends through the foam core 138*a*, the composite core 130*a*, and a second side 166 of the set of skins 140*a*. A fifth fiber 158 can be a first direction fiber 142*a* and a partial span fiber 142*p* that extends through the foam core 138*a* and the composite core 130*a*. A sixth fiber 160 can be a second direction fiber 142*b* and a partial span fiber 142*p* that extends through the foam core 138*a*, a second side 168 of the composite core 130*a*, and the second side 166 of the set of skins 140*a*. It should be understood that any combination of first, second, third, fourth, fifth, and sixth fibers 150, 152, 154, 156, 158, 160 is contemplated. Further it should be understood that the first, second, third, fourth, fifth, and sixth fibers 150, 152, 154, 156, 158, 160 are exemplary and not meant to be limiting.

Benefits associated with the use of the airfoil assembly described herein include having a lighter airfoil assembly without sacrificing performance of the airfoil assembly when compared to a non-composite (e.g., cast) airfoil assembly. In other words, the materials used for the airfoil assembly are lighter than the materials used for the non-composite airfoil assembly. Further, the materials used in the airfoil assembly described herein do not sacrifice the ability to perform as intended within the turbine engine. The decreased weight, in turn, means an increased efficiency of the turbine engine when compared to a conventional turbine engine including the non-airfoil assembly.

Further benefits associated with the engine component, such as the airfoil assembly described herein, include an airfoil assembly able to withstand the mechanical stresses associated with the operation of the airfoil assembly when compared to a conventional airfoil assembly. When subject to bending loads the airfoil assembly disclosed herein is most efficient with a high in-plane modulus and strength set of skins for carrying in-plane bending loads. The foam core and the composite core resists transverse shear forces. Additionally, a transverse modulus of the foam core and the composite core affects overall airfoil bending stiffness. The disclosure herein provides Z-fibers to increase the foam core modulus and strength. Additionally, connecting the set of skins, the composite core, and the foam core together via the Z-fibers improves resistance of the airfoil when under such loads as foreign object ingestion by efficiently transmitting the loads along the thickness direction from the set of skins to the foam core.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

An airfoil assembly for a turbine engine having an engine core extending along an engine centerline, the airfoil assembly comprising an airfoil extending in a radial direction between a root and a tip in a radial direction, away from the engine centerline, to define a span length, the airfoil comprising a composite core and having a set of Z-fibers extending therethrough, and a set of skins overlying the composite core and defining at least a portion of an exterior surface of the airfoil; and a shank extending radially below in the radial direction from the root toward the engine centerline between a first end and a second end, the shank comprising the composite core and the set of skins and having a flared cross-section.

The airfoil assembly of any preceding clause, wherein the set of Z-fibers extend through the foam core and at least a portion of the composite core.

An airfoil assembly for a turbine engine having an engine core extending along an engine centerline, the airfoil assembly comprising an airfoil extending between a root and a tip in a radial direction, away from the engine centerline, to define a span length, the airfoil comprising a composite core and a set of skins overlying the composite core and defining at least a portion of an exterior surface of the airfoil; a set of Z-fibers extending through a middle of the airfoil; and a shank extending in the radial direction from the root toward the engine centerline between a first end and a second end, the shank comprising the composite core and the set of skins and having a flared cross-section.

The airfoil assembly of any preceding clause, further comprising a foam core located within the composite core, wherein the set of Z-fibers extend through the foam core and at least a portion of the composite core.

The airfoil assembly of any preceding clause, wherein a mid-plane extends along a centerline axis CA central to the airfoil and wherein the set of Z-fibers includes first direction fibers that extend along a first direction through the airfoil mid-plane at a first fiber angle measured between a single fiber and the mid-plane.

The airfoil assembly of any preceding clause, wherein the first fiber angle is from 30 to 90 degrees.

The airfoil assembly of any preceding clause, wherein the set of Z-fibers includes second direction fibers extending along a second direction through the airfoil mid-plane at a second fiber angle measured between a single first fiber and the mid-plane.

The airfoil assembly of any preceding clause, wherein the first fiber angle is from 30 to 90 degrees and the second fiber angle is from −30 to 90 degrees.

The airfoil assembly of any preceding clause, wherein the airfoil defines a thickness and the set of Z-fibers extend through a mid-plane central to the airfoil and span from 5% to 100% of the thickness.

The airfoil assembly of any preceding clause, wherein the set of Z-fibers extend through at least a portion of the set of skins.

The airfoil assembly of any preceding clause, wherein the set of Z-fibers extend through an entire thickness of the airfoil.

The airfoil assembly of any preceding clause, wherein the composite core comprises a 3D composite layer.

The airfoil assembly of any preceding clause, wherein the 3D composite layer is a dry preform or a precured preform and is combined with the set of skins by Resin Transfer Molding (RTM) or Same Qualified Resin Transfer Molding (SQ-RTM) to form a single composite component.

The airfoil assembly of any preceding clause, wherein the set of skins comprise at least one laminated skin or at least one braided skin.

The airfoil assembly of any preceding clause, wherein the set of skins comprise at least one of filler plies or machining plies.

The airfoil assembly of any preceding clause, wherein the set of skins are prepreg laminates.

The airfoil assembly of any preceding clause, wherein the 3D composite layer comprises a woven composite preform formed from at least one material oriented in three different directions.

The airfoil assembly of any preceding clause, wherein the foam core comprises a tapered end point located above the radially outward from the root and within the composite core.

The airfoil assembly of any preceding clause, wherein the root defines 0% of the span length and the tip defines 100% of the span length and the tapered end point is between 0% and 5% of the span length.

The airfoil assembly of any preceding clause, wherein at least a portion of the composite core and the set of skins each include a composite material including at least one of a polymer matrix composite, a ceramic matrix composite, a metal matrix composite, a carbon fiber, a polymeric resin, a thermoplastic, a bismaleimide, a polyimide, an epoxy resin, a glass fiber, or a silicon matrix.

An engine component for a turbine engine, the engine component comprising a composite core; a foam core located within the composite core; a set of skins overlying the composite core and defining at least a portion of an exterior surface of the component; and a shank extending radially below the root between a first end and a second end, the shank comprising the composite core and the set of skins and having a flared cross-section.

The engine component of any preceding clause, further comprising a set of Z-fibers extending through at least a portion of the foam core and the composite core.

What is claimed is:

1. An airfoil assembly for a turbine engine having an engine core extending along an engine centerline, the airfoil assembly comprising:
   an airfoil extending between a root and a tip in a radial direction, away from the engine centerline, to define a span length, the airfoil comprising a composite core, a foam core located within the composite core and having a set of Z-fibers extending therethrough, and a set of skins overlying the composite core and defining at least a portion of an exterior surface of the airfoil, the airfoil having a centerline axis extending between the root and the tip; and
   a shank extending in the radial direction from the root toward the engine centerline between a first end and a second end, the shank comprising the composite core and the set of skins and having a flared cross-section, wherein a mid-plane extends along the centerline axis, and the set of Z-fibers includes both full span fibers and partial span fibers, the full span fibers extending across an entire thickness of the airfoil and the partial span fibers extending through the foam core and the composite core with at least one partial span fiber spanning from 5% to 70% of the entire thickness of the airfoil; and
   wherein the partial span fibers include:
      a set of first direction fibers that extend along a first direction through the mid-plane at a first fiber angle, the first fiber angle being measured between a single first direction fiber of the set of first direction fibers and the mid-plane; and
      a set of second direction fibers that extend along a second direction through the mid-plane at a second fiber angle, different from the first fiber angle, the second fiber angle being measured between a single second direction fiber of the set of second direction fibers and the mid-plane.

2. The airfoil assembly of claim 1, wherein the first fiber angle is from 30 to 90 degrees.

3. The airfoil assembly of claim 1, wherein the first fiber angle is from 30 to 90 degrees and the second fiber angle is from −30 to −90 degrees.

4. The airfoil assembly of claim 1, wherein the partial span fibers further extend through at least a portion of the set of skins.

5. The airfoil assembly of claim 1, wherein the composite core comprises a 3D composite layer.

6. The airfoil assembly of claim 5, wherein the 3D composite layer is a dry preform or a precured preform and is combined with the set of skins by Resin Transfer Molding (RTM) or Same Qualified Resin Transfer Molding (SQ-RTM) to form a single composite component.

7. The airfoil assembly of claim 6, wherein the set of skins comprise at least one laminated skin or at least one braided skin.

8. The airfoil assembly of claim 6, wherein the set of skins comprise at least one of filler plies or machining plies.

9. The airfoil assembly of claim 6, wherein the set of skins are prepreg laminates.

10. The airfoil assembly of claim 5, wherein the 3D composite layer comprises a woven composite preform formed from at least one material oriented in three different directions.

11. The airfoil assembly of claim 1, wherein the foam core comprises a tapered end point located radially outward from the root and within the composite core.

12. The airfoil assembly of claim 11, wherein the root defines 0% of the span length and the tip defines 100% of the span length and the tapered end point is between 0% and 5% of the span length.

13. The airfoil assembly of claim 1, wherein at least a portion of the composite core and the set of skins each include a composite material including at least one of a polymer matrix composite, a ceramic matrix composite, a metal matrix composite, a carbon fiber, a polymeric resin, a thermoplastic, a bismaleimide, a polyimide, an epoxy resin, a glass fiber, or a silicon matrix.

14. The airfoil assembly of claim 1, wherein the set of Z-fibers extends through a middle of the airfoil.

15. The airfoil assembly of claim 1, wherein the foam core extends from 20% to 80% of the span length.

16. The airfoil assembly of claim 1, wherein at least one partial span fiber spans from 20% to 50% of the entire thickness of the airfoil.

17. The airfoil assembly of claim 1, wherein the partial span fibers are first-mid extension fibers, and the set of Z-fibers further includes second mid-extension fibers extending through the foam core.

18. The airfoil assembly of claim 1, wherein the composite core comprises a first side and a second side located on opposite ends of the foam core, and at least one partial span fiber extends through the foam core and the first side.

19. An airfoil assembly for a turbine engine having an engine core extending along an engine centerline, the airfoil assembly comprising:
- an airfoil extending between a root and a tip in a radial direction, away from the engine centerline, to define a span length, the airfoil comprising a composite core, a foam core located within the composite core and having a set of Z-fibers extending therethrough, and a set of skins overlying the composite core and defining at least a portion of an exterior surface of the airfoil, the airfoil having a centerline axis extending between the root and the tip wherein the centerline axis is equidistant from respective opposing portions of the airfoil assembly and wherein the airfoil is symmetrical about the centerline axis; and
- a shank extending in the radial direction from the root toward the engine centerline between a first end and a second end, the shank comprising the composite core and the set of skins and having a flared cross-section,
- wherein a mid-plane extends along the centerline axis, and the set of Z-fibers includes both full span fibers and partial span fibers, the full span fibers extending across an entire thickness of the airfoil and the partial span fibers extending through the foam core and the composite core; and
- wherein the partial span fibers include:
  - a set of first direction fibers that extend along a first direction through the mid-plane at a first fiber angle, the first fiber angle being measured between a single first direction fiber of the set of first direction fibers and the mid-plane; and
  - a set of second direction fibers that extend along a second direction through the mid-plane at a second fiber angle, different from the first fiber angle, the second fiber angle being measured between a single second direction fiber of the set of second direction fibers and the mid-plane.

20. An airfoil assembly for a turbine engine having an engine core extending along an engine centerline, the airfoil assembly comprising:
- an airfoil extending between a root and a tip in a radial direction, away from the engine centerline, to define a span length, the airfoil comprising a composite core, a foam core located within the composite core and having a set of Z-fibers extending therethrough, and a set of skins overlying the composite core and defining at least a portion of an exterior surface of the airfoil, the airfoil having a centerline axis extending between the root and the tip; and
- a shank extending in the radial direction from the root toward the engine centerline between a first end and a second end, the shank comprising the composite core and the set of skins and having a flared cross-section,
- wherein a mid-plane extends along the centerline axis, and the set of Z-fibers includes both full span fibers and partial span fibers, the full span fibers extending across an entire thickness of the airfoil and the partial span fibers extending through the foam core and the composite core;
- wherein the partial span fibers include:
  - a set of first direction fibers that extend along a first direction through the mid-plane at a first fiber angle, the first fiber angle being measured between a single first direction fiber of the set of first direction fibers and the mid-plane; and
  - a set of second direction fibers that extend along a second direction through the mid-plane at a second fiber angle, different from the first fiber angle, the second fiber angle being measured between a single second direction fiber of the set of second direction fibers and the mid-plane; and
- wherein a cross-section of the airfoil includes a partial span fiber of the set of first direction fibers intersecting another partial span fiber of the set of second direction fibers.

* * * * *